March 31, 1942.    G. C. MAYFIELD    2,277,926
PISTON PACKING
Filed April 17, 1941
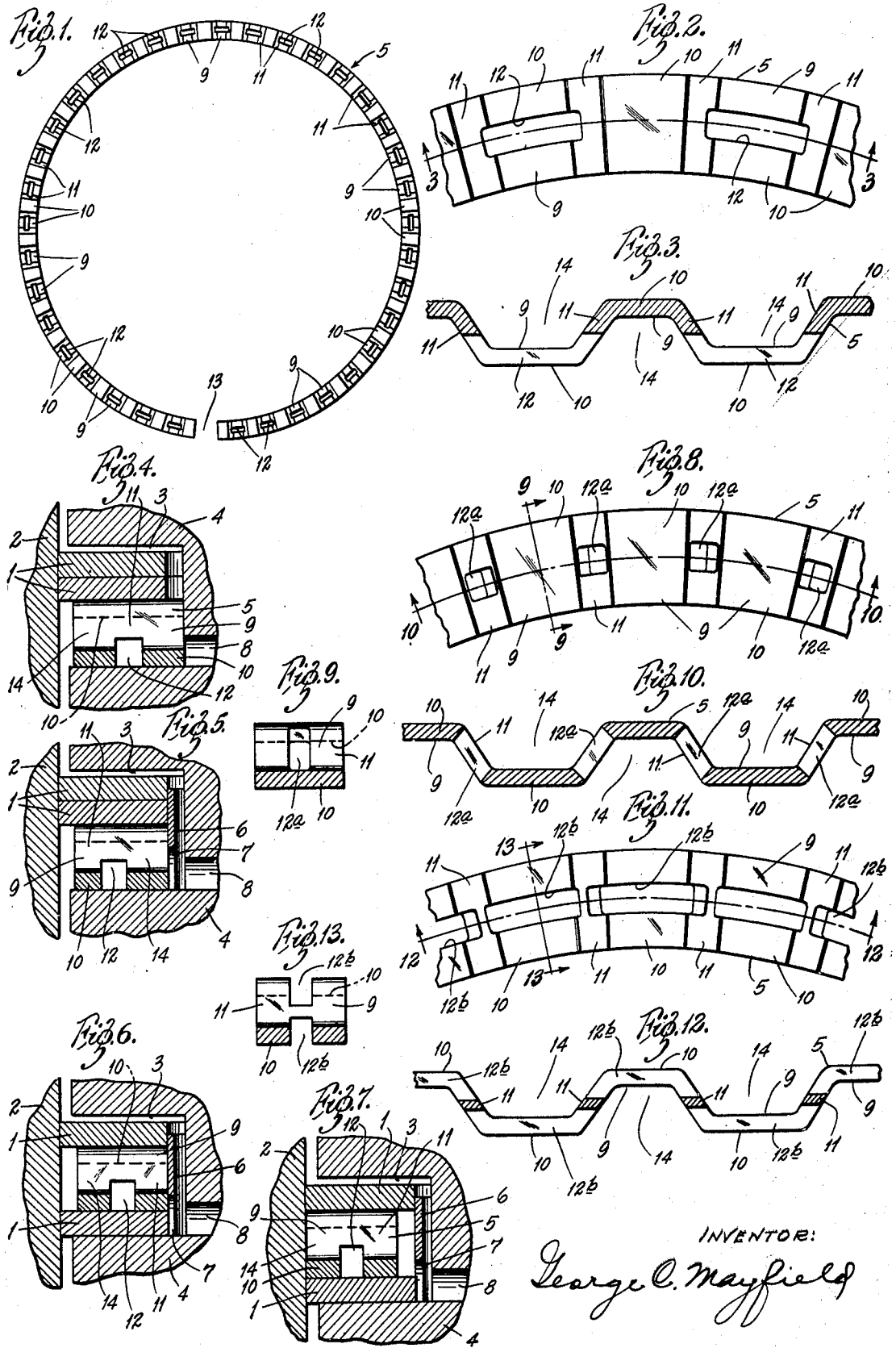

Patented Mar. 31, 1942

2,277,926

UNITED STATES PATENT OFFICE 2,277,926

PISTON PACKING

George C. Mayfield, Richmond Heights, Mo., assignor to McQuay-Norris Manufacturing Company, St. Louis, Mo., a corporation of Delaware Application April 17, 1941, Serial No. 388,965

3 Claims. (Cl. 309—45)

My invention relates to piston packings and more particularly to multiple piece piston packings adapted for use as oil control rings.

Piston packings as used heretofore for oil control purposes frequently clogged with carbon formations after being used for a short time so that oil removed from the cylinder wall no longer flowed freely through the oil drainage openings provided in the packing for that purpose. The carbon formations adhered to the bounding walls of the oil drainage openings of the packings and gradually sealed the openings completely.

This was true when the packings were used in the grooves of pistons provided with only a limited number of oil ports at the bottom thereof and arranged at spaced intervals thereabout. Unless a port was located in the piston immediately behind an oil vent in the ring, oil was trapped in the vent. Heat from the combustion gases and from the ring raised the temperature of this trapped oil considerably and since carbon deposits more freely at high temperatures than at low temperatures, carbon formations quickly clogged the vents. These vents then were practically useless in draining excess oil to the interior of the piston.

To overcome this difficulty my invention contemplates a piston packing in which the bounding walls of the oil vents are partially cut away. These cut away portions are arranged to connect the oil vents so that oil may flow freely from one vent to another to equalize the pressure in the various vents and to remove any carbon which might adhere to the bounding walls thereof.

Also by cutting away a portion of the bounding walls of the vents a break occurs therein and this tends to reduce the strength of the carbon formations adhering thereto.

A piston packing constructed according to my invention includes a spacer preferably formed of ribbon material bent edgewise to substantially circular form and bent flatwise to sinuous shape to form a series of substantially radial flutes, through which excess oil drains to the interior of the piston. The effective cross sectional area of the spacer then is greater than the cross sectional area of the material itself from which the spacer is made. Connecting the flutes are passages arranged circumferentially of the spacer to permit oil to pass from one flute to another. The packing may include also one or more thin ring members formed of ribbon material such as steel bent edgewise to substantially circular form. The ring members if more than one is used may be positioned side by side at one side of the spacer or the spacer may be located between the ring members and space the ring members from each other. In either event the spacer maintains the ring members in predetermined axial position in the ring groove. The packing may be used with or without an expander depending upon the conditions under which the packing is used. Also the spacer may engage the cylinder wall and function as a sealing member or it may serve merely as a spacer.

A piston packing of the kind described briefly above permits oil scraped from the cylinder wall by the ring members to drain freely therethrough even after considerable use and the spacer will not become clogged with carbon formations. This result occurs due to the reduced length of the bounding walls of the flutes in cutting away a portion thereof to form the passages connecting the flutes. Also, the connecting passages permit oil to spread circumferentially through the spacer to equalize the oil pressure in the flutes and to allow oil to flow from a flute with no port immediately therebehind to a flute having a port in alignment therewith, whereby oil cannot become trapped in the spacer. A spacer of the kind described briefly above, therefore, has a substantially large oil capacity.

Having thus briefly described my invention one object thereof is to provide a piston packing which may be used as an oil control ring.

Another object of my invention is to provide a piston packing in which the oil pressure is equalized throughout the packing.

Another object of my invention is to provide a piston packing which has a substantially large oil capacity.

A more specific object of my invention is to provide a piston packing which will not become clogged with carbon formations after considerable use.

Other objects and advantages will be apparent to those skilled in the art from the following description wherein reference is made to the drawing illustrating several preferred embodiments of my invention and wherein like reference numerals designate like parts throughout the several views.

In the drawing Fig. 1 is a plan view of a spacer of a piston packing constructed according to my invention.

Fig. 2 is a detail plan view of a portion of the spacer.

Fig. 3 is a vertical section on the line 3—3 of Fig. 2.

Figs. 4, 5, 6, and 7 show various arrangements of piston packings constructed according to my invention.

Fig. 8 is a detailed plan view of a second embodiment of a spacer constructed according to my invention.

Figs. 9 and 10 are vertical sections on the lines 9—9 and 10—10 respectively of Fig. 8.

Fig. 11 is a detailed plan view of a third embodiment of a spacer constructed according to my invention.

Figs. 12 and 13 are vertical sectional views taken on the lines 12—12 and 13—13 respectively of Fig. 11.

Referring to the figures the piston packings shown therein comprise a pair of thin split ring members 1 formed preferably of ribbon material bent to substantially circular form and in engagement with the cylinder wall 2. The ring members 1 are maintained in predetermined position in the ring groove 3 of a piston 4 by a spacer 5 described more fully hereinafter. In the embodiment of Fig. 4 the ring members 1 are positioned side by side and are placed in the upper portion of the ring groove 3 and the spacer 5 is positioned at the side of the lowermost ring member 1 and in the lower portion of the groove 3. The spacer 5 in this embodiment preferably hugs the bottom of the ring groove 3 and does not contact the cylinder wall. In the embodiment of Fig. 5 the arrangement of the ring members 1 and spacer 5 is the same as in Fig. 4, but in this embodiment an expander 6 is used with the assembly to urge the ring members 1 radially outwardly toward the cylinder wall. In this assembly the spacer hugs the expander 6. In the embodiment of Fig. 6 the ring members 1 are positioned adjacent the sides of the ring groove 3 and the spacer 5 is located between the ring members 1 and spaces the ring members from each other. In this embodiment an expander 6 also is used and the spacer 5 hugs the expander and does not engage the cylinder wall. In the embodiment of Fig. 7 the arrangement of the various elements of the piston packing is the same as in Fig. 6 with the exception that the spacer 5 engages the cylinder wall 2 to act as a sealing member. In all of the embodiments described above the spacer 5 has a gap 13 between the ends thereof and preferably is inherently resilient and this resiliency of the spacer in Figs. 4, 5, and 6 urges the spacer inwardly to contact the bottom of the ring groove 3 or the expander 6 in those embodiments in which an expander is used. In the embodiment of Fig. 7, this inherent resiliency of the spacer 5 urges the spacer radially outwardly to engage the cylinder wall.

The ring members 1 of all the embodiments described above engage the cylinder wall 2 and provide a seal between the piston 4 and the cylinder 2 in which the packing is used and remove excess oil from the cylinder wall. This excess oil flows through oil vents 14 in the spacer and through cut away portions 7 in the expander, in those embodiments in which an expander is used, and thence through ports 8 at the bottom of the ring groove 3 into the hollow interior of the piston 4.

The spacer 5, used in the piston packing described above, is formed of thin flat ribbon material, such as hard or soft steel, bronze, or other suitable material, bent edgewise to substantially circular form and bent flatwise to sinuous shape to form a series of substantially radial flutes 9 which form the oil vents 14 mentioned above. The flutes 9 after formation are bounded on three sides by horizontal portions 10 and oblique portion 11 of the spacer formed and arranged as shown in the drawing. The flutes are bounded on the fourth side by the ring members 1, or by a side wall of the ring groove 3, depending on the arrangement of the various parts of the packing in the ring groove. Portions of the horizontal and oblique bounding walls of the flutes 9 are cut away to form a series of circumferentially arranged passages 12 connecting the flutes. In the embodiment of Figs. 1, 2, and 3 the circumferential passages 12 are formed in the spacer by slotting alternate horizontal portions 10 of the spacer 5 and extending the slots partially into the oblique portions 11. In the embodiment of Figs. 8, 9, and 10 the passages 12a are formed by slotting only the oblique portions 11 of the spacer. In the embodiment of Figs. 11, 12, and 13 the oil passages 12b are formed by slotting each of the horizontal portions 10 and permitting the slots to extend partially into the oblique portions 11. However, the slots in adjacent horizontal portions 10 do not meet whereby a small part of the oblique portion 11 is left intact.

By slotting the spacer 5 circumferentially as described above to provide passages 12, oil may pass from one flute 9 to another to equalize the oil pressure throughout the spacer and to permit free drainage of oil to the interior of the piston. Also, the spacer will not become clogged with carbon formation because such formations are removed by oil flowing through the passages 12 from one flute 9 to another and, therefore, the formations cannot bridge the gap formed by the passages 12 in the bounding walls of the flutes 9. In addition the oil capacity of the spacer is quite large because of the ability of the passages to receive oil and this, in turn, permits free drainage of oil from the cylinder wall.

While I have described several embodiments of my invention it is to be understood that I do not limit myself to the forms and arrangements shown and described because other forms and arrangements may be used also without deviating from the scope of my invention. For instance, in some instances it may be found expedient to drill holes in the spacer either in the horizontal portions thereof or in the oblique portions, or perhaps in both portions of the spacer instead of slotting the spacer as shown in the drawing. And the connecting passages may be arranged in ways other than those described herein and still come within the scope of my invention. A spacer constructed according to my invention preferably is slightly resilient axially but it may be constructed so as to be substantially rigid axially if desired by forming the oblique portions 11 at an angle of approximately 90 degrees to the horizontal portions 10.

I claim:

1. In a piston packing for use in the ring groove of a piston and including a thin steel ring member, a spacer adapted to maintain said member in predetermined axial position in said groove, said spacer comprising a piece of ribbon material bent to form a series of substantially radial flutes and passages formed in said spacer and connecting one flute with another, said spacer being arranged so that the inner peripheral surface thereof bears against the portion of the piston or packing radially inwardly thereof.

2. In a piston packing for use in the ring groove of a piston and including a pair of thin steel ring members, a spacer adapted to maintain said members in predetermined axial position in said groove, said spacer comprising a piece of ribbon material bent sinuously to form a series of substantially radial flutes, and passages formed in the bounding walls of said flutes connecting one flute with another, said spacer being arranged so that the inner peripheral surface thereof bears against the bottom of the ring groove.

3. In a piston packing for use in the ring groove of a piston and including a pair of thin steel ring members and an expander urging said ring members yieldingly outwardly toward the cylinder wall, a spacer adapted to maintain said members in predetermined axial position in said groove, said spacer comprising a piece of ribbon steel bent flatwise to sinuous shape to form a series of substantially radial flutes, passages formed in the bounding walls of said flutes connecting one flute with another, and the inner peripheral surface of said spacer bearing against said expander.

GEORGE C. MAYFIELD.